(12) United States Patent
Mickos

(10) Patent No.: US 11,325,844 B2
(45) Date of Patent: May 10, 2022

(54) DECONTAMINATION METHOD AND APPARATUS FOR EFFLUENTS

(71) Applicant: PHARMTEC SA, Saint Germain en Laye (FR)

(72) Inventor: Mats Mickos, Le Pecq (FR)

(73) Assignee: PHARMTEC SA, Saint Germaine en Laye (FR)

( * ) Notice: Subject to any disclaimer, the term of this patent is extended or adjusted under 35 U.S.C. 154(b) by 84 days.

(21) Appl. No.: 16/720,980

(22) Filed: Dec. 19, 2019

(65) Prior Publication Data

US 2020/0123020 A1 Apr. 23, 2020

Related U.S. Application Data

(62) Division of application No. 15/109,496, filed as application No. PCT/EP2015/050031 on Jan. 5, 2015, now abandoned.

(30) Foreign Application Priority Data

Jan. 3, 2014 (EP) .................................... 14368001

(51) Int. Cl.
*C02F 1/02* (2006.01)
*C02F 1/04* (2006.01)
*C02F 101/30* (2006.01)

(52) U.S. Cl.
CPC ................ *C02F 1/02* (2013.01); *C02F 1/041* (2013.01); *C02F 2101/30* (2013.01); *C02F 2303/04* (2013.01)

(58) Field of Classification Search
CPC ........ C02F 1/02; C02F 1/041; C02F 2101/30; C02F 2303/04
See application file for complete search history.

(56) References Cited

U.S. PATENT DOCUMENTS

2004/0208784 A1* 10/2004 Matsuda ................... A61L 2/04 422/38

FOREIGN PATENT DOCUMENTS

| CN | 2074297 U | 4/1991 | |
|---|---|---|---|
| CN | 201553630 U | 8/2010 | |
| CN | 101928097 A | 12/2010 | |
| CN | 102115221 A | 7/2011 | |
| DE | 4126619 A1 * | 2/1992 | ............... A61L 2/04 |
| JP | H057614 A | 1/1993 | |

OTHER PUBLICATIONS

Machine translation of DE 4126619 A1 (obtained from google patents Jun. 2021) (Year: 1992).*

(Continued)

*Primary Examiner* — Chester T Barry
(74) *Attorney, Agent, or Firm* — Ziegler IP Law Group, LLC

(57) ABSTRACT

An apparatus and method for decontamination of effluent, includes connecting a first ejector to source of a first motive fluid, directing from the first ejector first motive fluid into piping connected to a source of effluent thus causing the effluent to stream in the piping and simultaneously causing the effluent to be heated, and controlling the directing of the first motive fluid in such a way that a predetermined thermal effect is achieved.

6 Claims, 4 Drawing Sheets

(56) References Cited

OTHER PUBLICATIONS

China Patent Office, Board Decision, Application No. 201580008389.7, dated Mar. 2, 2021, 7 pages. English Translated Summary and Comments, 2 pages.
Qisheng "Practical Biomedical Materials Science" Shanghai Science and Technology Press, Sep. 2005, first edition, ISBN 7-5323-8011-4, 18 pages.
Yucun "Post Training Course for Hospital Disinfection Supply Center" People's Military Medical Press, Jun. 2013, first edition, ISBN: 978-7-5091-6674-1, 19 pages.
Translated Chinese Office Action and untranslated Search Report, Application No. 2015800083897, dated Jan. 3, 2019.

* cited by examiner

DECONTAMINATION METHOD AND APPARATUS FOR EFFLUENTS

TECHNICAL FIELD

The aspects of the disclosed embodiments generally relate to decontamination of effluents. The aspects of the disclosed embodiments relate to any effluent where heat treatment can reduce or eliminate any undesired effect, such as chemical, physical, biological reaction or activity (pathogen inactivation, protein denaturing, prion inactivation etc.). In particular, but not exclusively, the aspects of the disclosed embodiments relate to decontamination of effluent liquid from biologically contaminated areas. The aspects of the disclosed embodiments can also be used as part of a system for chemical treatment of effluents.

BACKGROUND

Effluent decontamination is carried out in order to inactivate micro-organisms—including pathogens—present in liquid effluents from sources such as research laboratories, pharmaceutical or biopharmaceutical production plants and further bio-contained areas. The decontamination is effected with the principles of sterilization, i.e. high temperature is applied for a sufficient time to achieve a reduction of microbial load. A skilled person appreciates that the principles of sterilization are in an embodiment applied for other purposes as to living micro-organisms, such as prion inactivation.

Decontamination is traditionally carried out in static conditions in so called kill tanks, i.e. the liquid effluent is placed in a tank, heated, and maintained under a certain temperature for a certain time. Subsequently, the liquid is cooled and discharged into a drain. Validation of a static decontamination process is challenging, as the temperature distribution may be compromised due to various reasons such as air pouches and type of heating. Furthermore, kill tanks, being pressure vessels, require regular inspection, and their energy requirements and space requirements are large.

Dynamic decontamination systems, wherein the effluents are treated as a continuous stream are known. In a continuous system, the bio-waste, i.e. the effluent, is first collected into a storage tank, and then continuously heated under pressure using various techniques, prior to cooling and draining. Since the liquid effluent comprises contaminants such as organic matter and scaling agents, a continuous decontamination system has the drawback that the heating arrangements tend to soil the inner surfaces of the system with a contaminant layer. Thus frequent chemical washing is required.

Direct injection of steam into the effluent has been used for example instead of electrical heating or heat exchangers in order to overcome some drawbacks related to the contaminants present in the effluent. Such systems are less sensitive to for example organic contaminants but require that the effluent is under pressure, i.e. a pump is required.

Accordingly, the existing systems have several drawbacks. The performance of the static systems is difficult to validate, and the systems are expensive as well as time- and energy inefficient. Then again, the continuous systems may require frequent chemical cleaning, for example due to heating arrangements and very long piping runs, and include moving parts prone to fault and requiring service. Continuous systems also commonly include a feedback to the contaminated effluents for the heat-up phase of the system or in case of failure. This branch is a contamination risk in itself, and adds complexity to the system.

Decontamination systems are commonly critical to a continuing production of a facility. Accordingly, the aspects of the disclosed embodiments are directed to mitigating the problems of the existing technology and to provide a cost-effective, scalable, safe and easily validated decontamination.

SUMMARY

According to a first example aspect of the disclosed embodiments there is provided an apparatus for decontamination of effluent, comprising
  a first inlet configured to be connected to a source of a first motive fluid;
  a second inlet configured to be connected to a source of effluent;
  an outlet configured for discharging the effluent
  a first ejector configured to direct first motive fluid from the first inlet into piping connected to the second inlet thus causing the effluent to stream from the second inlet towards the outlet, and simultaneously causing the effluent to be heated.

The apparatus may further comprise
  a treatment tank positioned between the second inlet and the outlet and configured to hold the effluent until a predetermined decontamination effect is achieved;
  a second ejector configured to cause emptying the treatment tank by directing a second motive fluid into piping connecting the treatment tank to the outlet.

The apparatus may further comprise a third ejector configured to direct first motive fluid from the first inlet into the stream of effluent downstream from the first ejector thus causing the effluent to be heated further.

The apparatus may further be configured to cause the effluent to stream from the second inlet only in the direction of the outlet so that the effluent is inhibited from returning to the source of the effluent or to the second inlet.

The first and/or second motive fluid may comprise at least one of steam, water, liquid, compressed air and gas.

The apparatus may further comprise a first valve for regulating the supply of the first motive fluid and/or a second valve for regulating the supply of the effluent.

The apparatus may further comprise means for measuring the temperature of the effluent being decontaminated.

The apparatus may further comprise means for heating the effluent in the treatment tank.

The first ejector may be configured to direct first motive fluid from the first inlet into piping connected to the second inlet thus causing the effluent to stream from the second inlet towards the outlet, and simultaneously causing the effluent to be cooled.

According to a second example aspect of the disclosed embodiments there is provided a method for decontamination of effluent, comprising
  connecting a first ejector to source of a first motive fluid;
  directing from the first ejector first motive fluid into piping connected to a source of effluent thus causing the effluent to stream in the piping and simultaneously causing the effluent to be heated; and
  controlling the directing of the first motive fluid in such a way that a predetermined thermal effect is achieved.

The method may further comprise holding the effluent in a treatment tank for a predetermined time at a predetermined temperature; and emptying the treatment tank by injecting a second motive fluid into piping connecting the treatment tank to the outlet.

The method may further comprise directing first motive fluid from a third ejector into the stream of effluent downstream from the first ejector thus causing the effluent to be heated further.

The directing of the first motive fluid may be done in such a way as to inhibit the effluent from returning to the source of the effluent.

The method may further comprise measuring the temperature of the effluent being decontaminated.

The method may further comprise leak testing, air removal, and/or evacuation prior to causing the effluent to flow in the piping.

The directing may comprise directing from the first ejector first motive fluid into piping connected to a source of effluent thus causing the effluent to stream in the piping and simultaneously causing the effluent to be cooled.

Different non-binding example aspects of the disclosed embodiments have been illustrated in the foregoing. The above embodiments are used merely to explain selected aspects or steps that may be utilized in implementations of the disclosed embodiments. Some embodiments may be presented only with reference to certain example aspects of the disclosed embodiments. It should be appreciated that corresponding embodiments may apply to other example aspects as well.

BRIEF DESCRIPTION OF THE DRAWINGS

Some example embodiments will be described with reference to the accompanying drawings, in which.

DETAILED DESCRIPTION

In the following description, like reference signs denote like elements.

Figure 1:
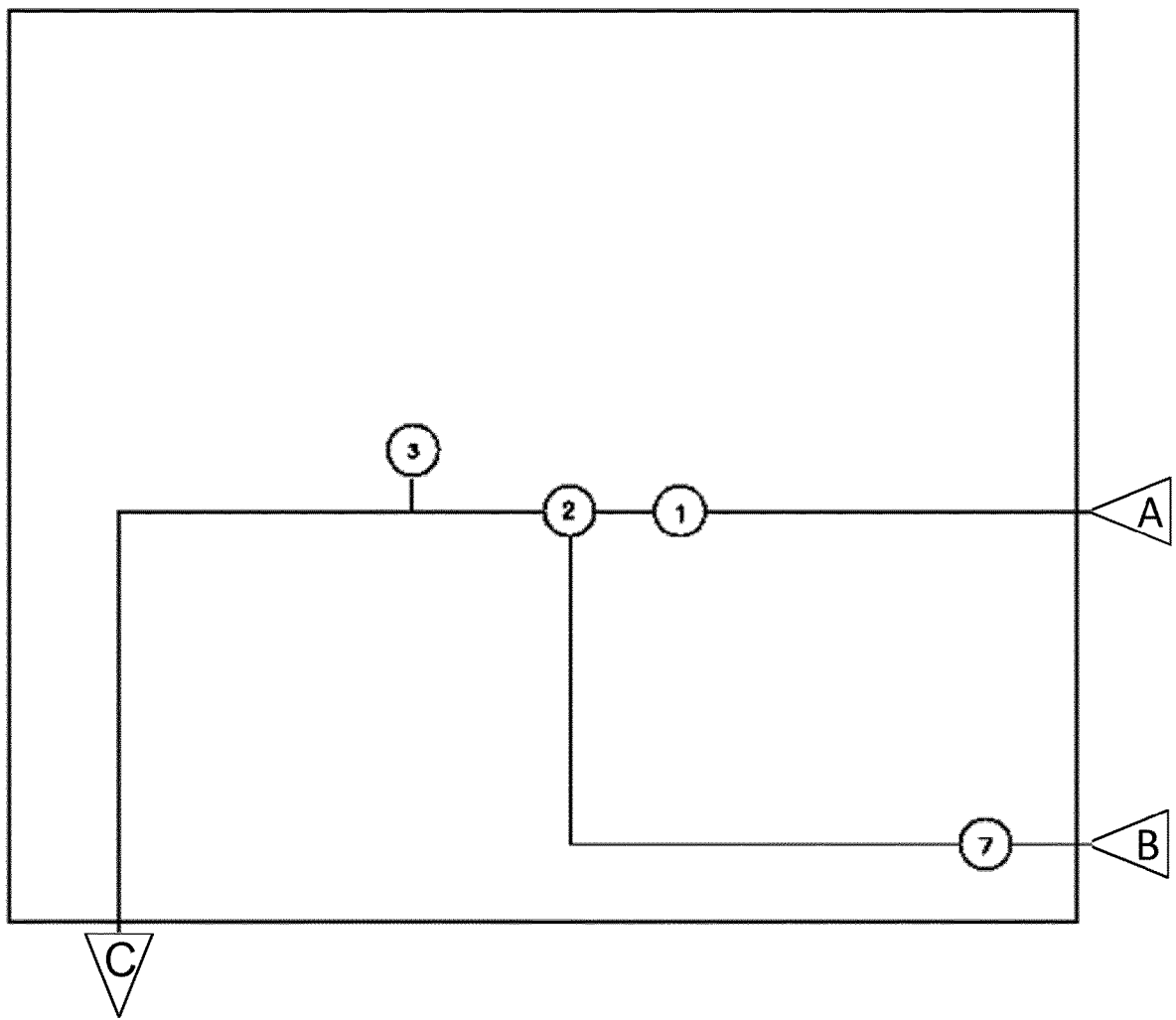
FIG. 1 shows a schematic example presentation of an apparatus incorporating aspects of the disclosed embodiments.

FIG. 1 shows a schematic example presentation of an apparatus incorporating aspects of the disclosed embodiments. The effluent decontamination apparatus 100 comprises a first inlet A configured to connect to a supply of motive fluid, such as steam, and a second inlet B configured to connect to a source of effluent, e.g. biological effluent, to be decontaminated. The apparatus 100 further comprises an outlet C for discharging the treated, i.e. decontaminated effluent into for example a drain. A skilled person appreciates that the inlets and the outlet are realized in a conventional manner, and that the source of the effluent is either a direct connection to a process of the facility the effluent of which is processed or the effluent is supplied from an intermediate storage such as a storage container or a transport vessel. Furthermore, the skilled person appreciates that instead of or in addition to a direct connection to a drain system the outlet of the decontaminated effluent is configured to connect to an intermediate storage such as a storage container or a transport vessel, or the outlet is for example configured to connect to a further treatment system. The effluent decontamination apparatus 100 further comprises piping connecting the elements described hereinbefore and hereinafter.

The effluent decontamination apparatus 100 comprises an ejector 2, or first ejector, configured to inject steam into the effluent stream. In an example embodiment, the motive fluid comprises, instead of or in addition to steam, hot water, a further hot liquid or hot gas, or an extremely cold liquid such as liquid nitrogen, in which case the thermal effect will be caused by freezing instead of heating. The ejector 2, a.k.a. injector, steam ejector, steam injector, eductor-jet pump or thermocompressor, is supplied with hot steam from the steam inlet A. The ejector 2 works as a conventional ejector, i.e. directs or injects a motive fluid, for example steam from the first inlet into the piping, i.e. into the effluent stream if the piping is filled with effluent, and the steam functions as a motive fluid causing the effluent to be sucked from the effluent inlet A. As the motive fluid, e.g. steam, mixes with the effluent, the effluent is heated to a predetermined temperature required to achieve the desired thermal effect, i.e. a reduction of microbial load. The flow velocity of the effluent is dependent on the design parameters of the ejector 2. A skilled person appreciates that the flow velocity of the effluent, and consequently the steam pressure and the design of the ejector, is chosen in such a way as to ensure that the effluent remains in the decontamination apparatus for a time sufficient for the desired thermal effect, i.e. decontamination. As heating, or in an embodiment cooling i.e. freezing, of the effluents occurs in a very short time period, the microorganisms are subjected to a thermal shock in the ejector, which in itself in an embodiment is sufficient to achieve the desired decontamination effect.

The passing of the motive fluid, for example steam, through the ejector 2 creates a local vacuum allowing the effluent liquid to be sucked into the local vacuum and dispersed into droplets that are mixed with the steam. Thus the effluent is heated without the use of hot surfaces and under negative pressure. As any constituents of the effluent, such as proteins and scaling agents are instantaneously heated without contact to the surfaces, any precipitation is transported with the stream of effluents and is removed from the system therewith. The high velocity of the fluids in the ejector, and downstream therefrom, also prevents clogging. Accordingly, the apparatus 100 according to the disclosed embodiments is highly resistant to clogging.

The apparatus 100 according to an embodiment further comprises a valve, or a first valve, 1 configured to regulate the supply of the motive fluid, e.g. steam, and a valve 7, or a second valve, configured to regulate the suction, i.e. the supply, of the effluent. It should be noted that the valves 1,7 are conventional valves configured for regulating a flow of a substance. Furthermore, in order to monitor the decontamination and the conditions, the apparatus 100 comprises a temperature probe, or a first temperature probe, 3 configured to measure the temperature of the effluent at the outlet of the ejector 2. A skilled person appreciates that any conventional temperature probe, such as a resistive sensor or a thermocouple, can be used as the first temperature probe 3. Furthermore, in an embodiment, a further temperature probe (not shown) is provided downstream of the first temperature probe in order to monitor that the desired thermal effect has been achieved.

Figure 2:
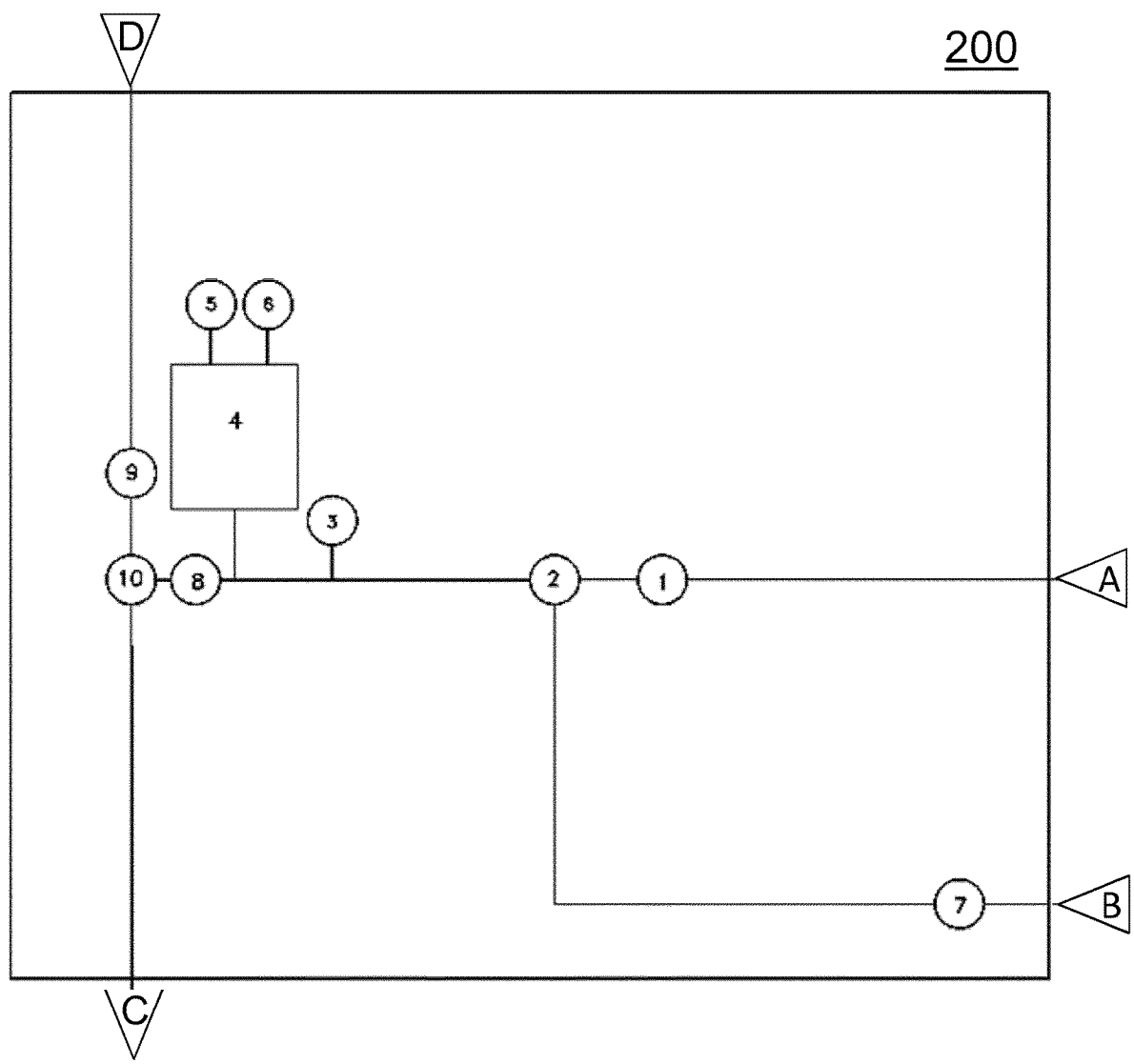
FIG. 2 shows a schematic example presentation of an apparatus incorporating aspects of the disclosed embodiments.

FIG. 2 shows a schematic example presentation of an apparatus according to a further embodiment. The apparatus 200 comprises, as described with reference to the apparatus of FIG. 1, a first inlet A configured to connect to a steam supply and a second inlet B configured to connect to a source of biological effluent to be decontaminated and an outlet C for discharging the treated, i.e. decontaminated effluent into for example a drain. The apparatus 200 further comprises a third inlet C configured to connect to a supply of motive fluid such as steam, compressed air, a further gas, water or a further liquid. The effluent decontamination apparatus 200 further comprises piping connecting the elements described hereinbefore and hereinafter.

The apparatus 200 further comprises, as also described hereinbefore with reference to FIG. 1, a first ejector 2 configured to inject a motive fluid, such as steam, into the effluent stream, a first valve 1 configured to regulate the supply of the motive fluid, e.g. steam, and a second valve 7 configured to regulate the suction, i.e. the supply, of the effluent, and a temperature probe, or a first temperature probe, 3 configured to measure the temperature of the effluent at the outlet of the ejector 2.

Figure 3:
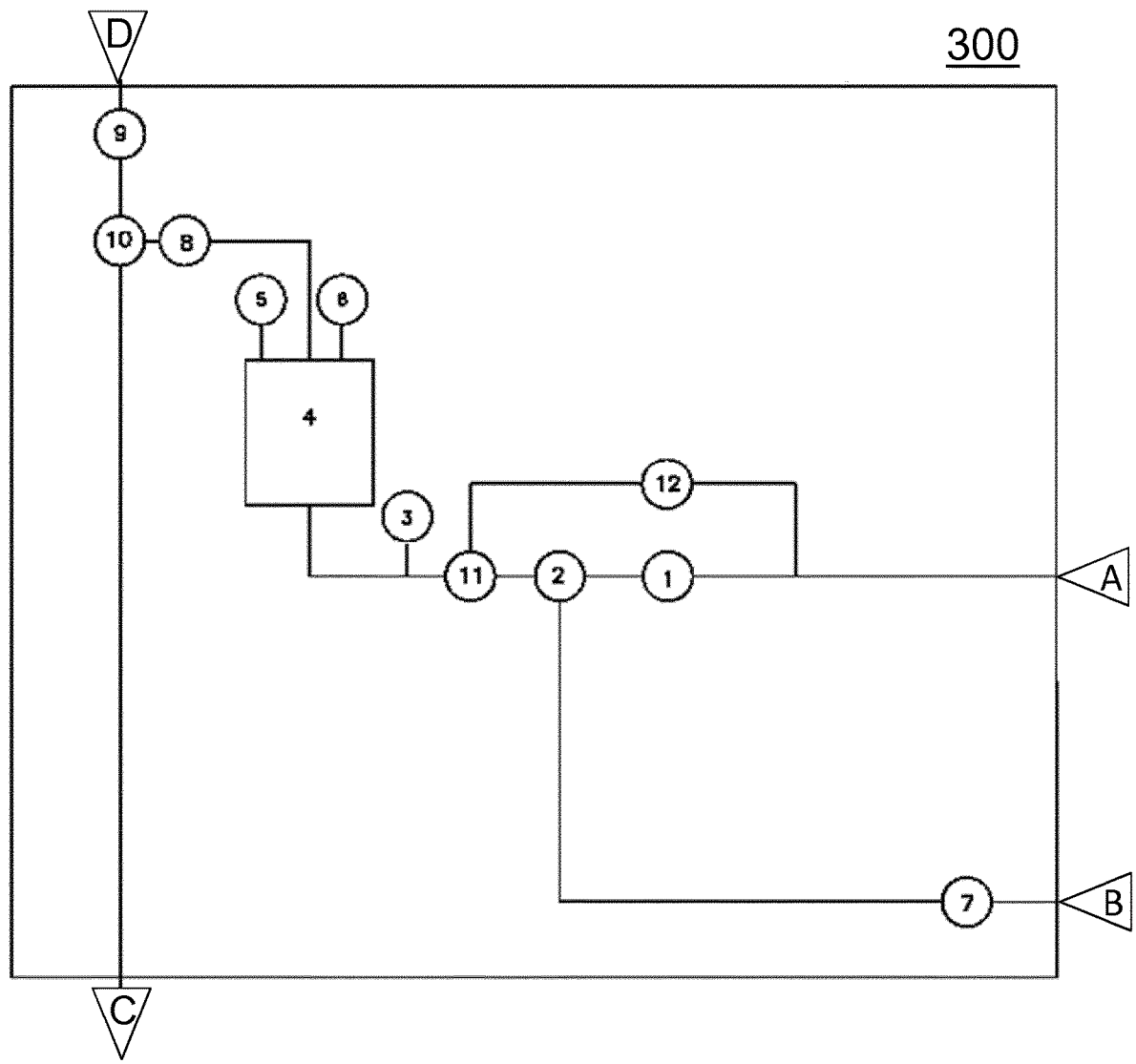
FIG. 3 shows a schematic example presentation of an apparatus incorporating aspects of the disclosed embodiments.

The apparatus 200 comprises a treatment tank 4 configured to hold the effluent until the desired, i.e. predetermined thermal effect, i.e. the predetermined decontamination effect, is achieved, i.e. for a predetermined time in a predetermined temperature or at varying temperatures until the desired thermal effect has been achieved. The treatment tank 4 is heated in a conventional manner. The apparatus 200 further comprises a second temperature probe 5 configured to measure the temperature of the effluent in the treatment tank 4, and a pressure probe 6 configured to measure the pressure in the treatment tank 4. The temperature probe 5 and the pressure probe 6 are of conventional type, as also hereinbefore described. In an embodiment, the apparatus comprises a treatment tank 4 with a single connection to effluent piping configured to function both as an inlet and an outlet for effluent. In a further embodiment, as shown in FIG. 3, the treatment tank comprises an inlet and an outlet configured to allow the effluent to flow through the treatment tank 4 continuously or intermittently.

In an example embodiment, the first 3 and the second 5 temperature probes, and any further temperature probes as described hereinbefore or hereinafter, comprise probes with dual sensing elements in order to ensure that a desired temperature effect has been applied. The readings of the dual sensing elements are in an embodiment compared to each other and need both to reside inside a predetermined range. In an embodiment, should one of the readings reside outside a predetermined range, the system is stopped and no effluent can exit the system. In a further example embodiment, the second temperature probe 5 is read by a safe programmable logic controller providing a safety integrity level 2 for the system.

The apparatus 200 further comprises a second ejector, or exhaust ejector, 10 configured to cause emptying of the treatment tank 4 by injecting a motive fluid into piping connecting the treatment tank 4 to the outlet C, i.e. to the effluent stream if the piping is already filled with effluent, thus causing the decontaminated effluent to be ejected through outlet C as hereinbefore described. The second ejector 10 functions as a conventional ejector, and similarly to the first ejector 2 as hereinbefore described. The motive fluid is supplied to the second ejector 10 through inlet D and comprises e.g. steam, water, a further liquid, compressed air or a further gas. The apparatus 200 further comprises a drain valve, or third valve, 8 configured to allow effluents to be removed from the storage tank 4 therethrough, and an isolation valve, or fourth valve, 9 configured to regulate the supply of motive fluid from inlet D. It should again be noted that the valves 8,9 are conventional valves configured for regulating a flow of a substance.

In a further embodiment, the second ejector 10 is further configured to cause evacuating the piping of the apparatus prior to introducing contaminated effluent therein. Accordingly, the problems in validating the decontamination caused by air pockets and uneven temperature distribution are mitigated. Furthermore, the second ejector is configured to evacuate the piping in order to test the apparatus for safety, as the evacuation requires all parts of the apparatus to be intact.

In a further embodiment, the second ejector 10 is connected to a hot fluid, e.g. steam, as motive fluid, an additional thermal decontamination effect can be given, thus creating consecutive thermal shocks to the micro-organisms. In such a case, the second ejector 10 functions in a manner similar to the first ejector also in view of the heating of the effluent. In a still further embodiment, several apparatuses according to an embodiment are connected in series until the desired thermal effect is reached.

FIG. 3 shows a schematic example presentation of an apparatus according to a still further embodiment. The apparatus 300 comprises, as described with reference to the apparatus of FIGS. 1 and 2, an inlet A configured to connect to a steam supply and an inlet B configured to connect to a source of biological effluent to be decontaminated, an outlet C, and an inlet D configured to connect to a supply of motive fluid such as stem, compressed air or water. The effluent decontamination apparatus 300 further comprises piping connecting the elements described hereinbefore and hereinafter.

The apparatus 300 also comprises, as also described hereinbefore with reference to FIGS. 1 and 2, a first ejector 2 configured to inject a motive fluid, e.g. steam, into the effluent stream. It is to be noted that the injection of the motive fluid causes the effluent to be sucked from the source thereof and, accordingly, no separate pump is needed for pumping the effluent. The apparatus 300 further comprises, as also described hereinbefore with reference to FIGS. 1 and 2, a first valve 1 configured to regulate the steam supply and a second valve 7 configured to regulate the suction, i.e. the supply, of the effluent, and a first temperature probe, 3 configured to measure the temperature of the effluent at the outlet of the ejector 2. The apparatus 300 also comprises, as hereinbefore described, a treatment tank 4 configured to hold the effluent until the desired thermal effect, a second temperature probe 5 configured to measure the temperature of the effluent in the treatment tank 4, and a pressure probe 6 configured to measure the pressure in the treatment tank 4.

The apparatus 300 also comprises, as also described hereinbefore with reference to FIGS. 1 and 2, a second ejector, or exhaust ejector, 10 configured to cause emptying the treatment tank 4, a drain valve, or third valve, 8 configured to allow effluents to be removed from the storage tank 4 therethrough, and an isolation valve, or fourth valve, 9 configured to regulate the supply of motive fluid from inlet D. In an embodiment, the second ejector 10 is not used during operation of the apparatus 300. In an embodiment, the second ejector is used to remove air from the piping and to test the apparatus for leaks. In a still further embodiment, the outlet C has a pressure regulated isolation valve (not shown) that will let out effluents under pressure. A skilled person appreciates that effluent outlet flow control and treatment tank 4 pressure control are implemented in an embodiment or in different combinations of embodiments using further means known in the art.

The apparatus 300 further comprises a third ejector 11 configured to inject a motive fluid into the piping, i.e. into the stream of effluents downstream from the first ejector 2 in order to heat the effluent to be decontaminated further. The third ejector injects a motive fluid, such as steam, into effluent stream under pressure, thereby raising the temperature of the effluent to the desired level. A skilled person appreciates that also an extremely cold liquid may be used in an embodiment as hereinbefore described with reference to the first ejector. The third ejector 11 allows the effluent stream to be heated further, and accordingly, the effluent decontamination process is carried out continuously also for effluents requiring longer exposure to heat or higher temperature. The apparatus 300 further comprises a fifth valve 12 configured to regulate the supply of motive fluid, e.g. steam, to the third ejector 11, and to isolate the third ejector from the motive fluid, e.g. steam supply, should the available pressure be insufficient for both the first and the third ejector to provide the necessary heating and flow, and also for leak tests in an embodiment. Furthermore, in an embodiment, the third ejector 11 is connected to a further source of motive fluid (not shown) separate from the first source of motive fluid and configured to supply the same or different type of motive fluid from that of the first source of motive fluid.

In an example embodiment, the apparatus 100,200,300 comprises, instead or in addition to the second valve 7 and the third valve 8, double valves between which the motive fluid, e.g. steam is injected at a pressure higher than that of the contaminated side in order to ensure leaktightness in a situation in which the pressure is higher on the contaminated side than on the non-contaminated side. In such a situation, the double valves ensure that should any leak occur, it will be towards the contaminated side. In an embodiment, the double valves with the steam injection therebetween are used at the effluent inlet line when using vacuum to test for leaks as hereinafter described and/or at the effluent outlet line when filling the system with effluent that is not yet treated fully.

In an example embodiment, the whole apparatus 100,200, 300 and/or the eventual storage tanks upstream of the apparatus 100,200,300 are decontaminated using the motive fluid, such as steam, injected from the first 2, second 10, or third 11 ejector. In an example embodiment, the decontamination of the effluents, and of the apparatus 100,200,300 is carried out without any steam traps, which increases operational safety and reduces complexity of the installation of the decontamination apparatus 100,200,300.

It is to be noted, that the apparatus 100,200,300 according to an embodiment comprises and requires no feedback connection towards the contaminated effluents, i.e. back to the effluent storage or to the inlet B, as the start-up phase is totally self-enclosed. In a further example embodiment, the effluents under treatment are automatically led back to the infeed line, i.e. to the effluent storage or to the inlet B, if the treatment process has failed, for example if the desired temperature effect has not been reached, in order to decontaminate the apparatus 100,200,300. The decontamination apparatus 100,200,300 is in an embodiment controlled manually, e.g. by manually adjusting the valves, the heating etc. In a further embodiment, the apparatus 100,200,300 is controlled by for example a microprocessor based automatic control unit (not shown in FIGS. 1-3) that is either integrated into the apparatus or provide as a separate unit connected to the apparatus e.g. through a wired or wireless connection.

Figure 4:
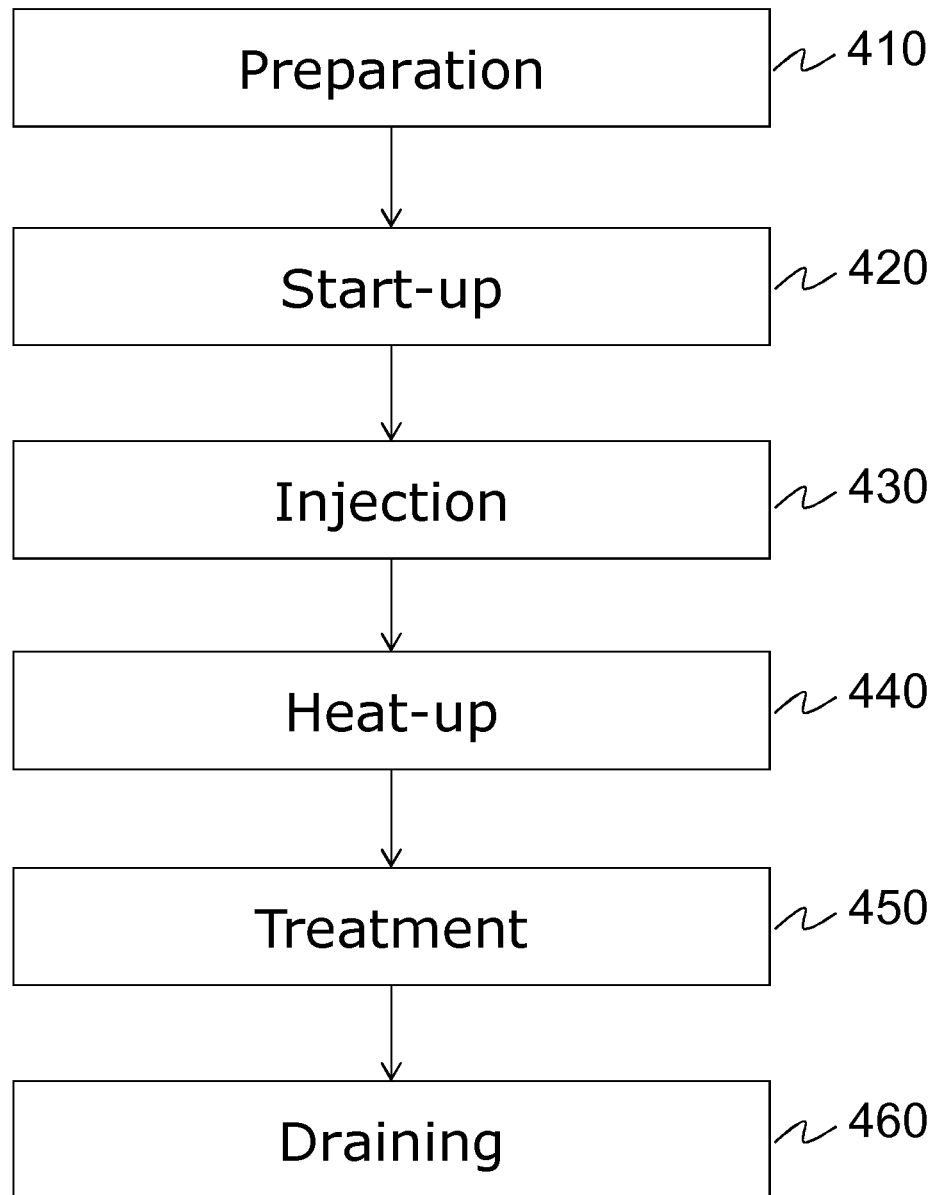
FIG. 4 shows a flowchart of a method incorporating aspects of the disclosed embodiments.

FIG. 4 shows a flowchart of a method according to an embodiment. At step 410, preparatory actions are carried out. In an embodiment, a leak test is carried out for the apparatus 100,200,300 by evacuating the piping using the second ejector 10. A skilled person appreciates that the apparatus 100, in an embodiment, also comprises a second ejector 10. In a further embodiment, air is removed from the apparatus by evacuating and/or with pulses of motive fluid, such a steam. In a still further embodiment, the apparatus 100,200,300 is evacuated prior to start-up phase 420.

At step 420 a start-up of the apparatus is carried out. Depending on the composition of the apparatus 100,200,300 and the preparatory steps previously taken, the start-up comprises starting the first ejector 2 and letting the effluents into the piping in a predetermined order. In an embodiment, the effluents are directed to a pre-evacuated treatment tank 4 prior to starting the first ejector 2.

At step 430 motive fluid is directed, i.e. injected, into the effluent piping in order to heat the effluent and to cause the effluent to flow in the piping as hereinbefore described, the following steps of heat-up 440, treatment 450 and draining 460 are carried out continuously as hereinbefore described and controlled in such a way that a desired thermal effect is achieved. In an example embodiment, the thermal effect F(0) is calculated with the formula of $$F(0)=\Sigma(t=0 \text{ to } n)e \text{ EXP}[(T-121)/Z],$$

wherein t is time, T is the treatment temperature and Z is a micro-organism dependent sensitivity to increased temperature, normally accepted as 10° C., i.e. a 10° C. increase results in a 10-fold killing effect.

In the following, an empirical example of the operation of an apparatus 200 according to an embodiment is presented: The treatment tank 4 has a fill volume of about 20 liters. Saturated, dry steam of 3.5 bar(g) is used as motive fluid for the first and the second ejector 2,10. A vacuum test is carried out at −0.8 bar(g) (200 mB) for 10 minutes, with less than a 13 mB rise in pressure. Three vacuum/steam pulses −0.8/+1.5 bar(g) are used at initial heat up. After pressure pulse, the apparatus is evacuated to 0 Bar(g) to wait for a start signal. At start, initial vacuum pulse of −0.8 bar(g), then opening of the effluent valve 7 followed by the steam valve 1. Effluent and steam are regulated so that the temperature at 3 is about 85-90° C. After filling (20 liters) of the treatment tank 4, the effluent valve 7 is closed and the heating continued. Heating temperature was set at 140° C. Thermal effect was set at 50*. After thermal effect is reached, drain valve is opened until pressure 0 bar(g). End of cycle is reached with a total cycle time of 5.5 minutes. Hourly treatment capacity is thus 220 liters/hour.

Without in any way restricting the scope of the disclosed embodiments defined by the appended claims, a technical effect of the disclosed embodiments is to provide a flexible decontamination apparatus and method, wherein the treatment capacity, thermal effect and the duration of decontamination can be easily selected and adjusted. Another technical effect of the disclosed embodiments is to provide a decontamination apparatus and method that avoids clogging and soiling of the system. Still another technical effect of the disclosed embodiments is to provide an apparatus less prone to mechanical failure due to less moving parts. A further technical effect of the disclosed embodiments is to provide increased operational safety due to simple leak testing.

The foregoing description has provided by way of non-limiting examples of particular implementations and embodiments and a full and informative description of the best mode presently contemplated by the inventors for carrying out the aspects of the disclosed embodiments. It is however clear to a person skilled in the art that the aspects of the disclosed embodiments are not restricted to details of the embodiments presented above, but that it can be implemented in other embodiments using equivalent means or in different combinations of embodiments without deviating from the characteristics of the aspects of the disclosed embodiments.

Furthermore, some of the features of the above-disclosed embodiments may be used to advantage without the corresponding use of other features. As such, the foregoing description shall be considered as merely illustrative of the principles of the aspects of the disclosed embodiments, and not in limitation thereof. Hence, the scope of the disclosed embodiments is only restricted by the appended claims.

The invention claimed is:

1. A method for decontamination of effluent, comprising:
    connecting a first ejector (2) to source of a first motive fluid;
    directing from the first ejector (2) first motive fluid into piping connected to a source of effluent thus causing the effluent to stream in the piping and simultaneously causing the effluent to be heated; and
    controlling the directing of the first motive fluid in such a way that a predetermined thermal effect is achieved;
    the method further comprising removing air from the piping with pulses of steam prior to causing the effluent to stream into the piping.

2. The method of claim 1, further comprising holding the effluent in a treatment tank (4) for a predetermined time at a predetermined temperature; and emptying the treatment tank (4) by injecting a second motive fluid into piping connecting the treatment tank (4) to the outlet.

3. The method of claim 1, further comprising directing first motive fluid from a further ejector (12) into the stream of effluent downstream from the first ejector (2) thus causing the effluent to be heated further.

4. The method of claim 1, wherein directing the first motive fluid is done in such a way as to inhibit the effluent from returning to the source of the effluent.

5. The method of claim 1, further comprising measuring the temperature of the effluent being decontaminated.

6. The method of claim 1, further comprising leak testing prior to causing the effluent to flow in the piping.

* * * * *